Feb. 2, 1965 C. HOROWITZ 3,168,353
FLUID PRESSURE CONTROL SYSTEM AND VALVE THEREFOR
Filed June 13, 1962 2 Sheets-Sheet 1
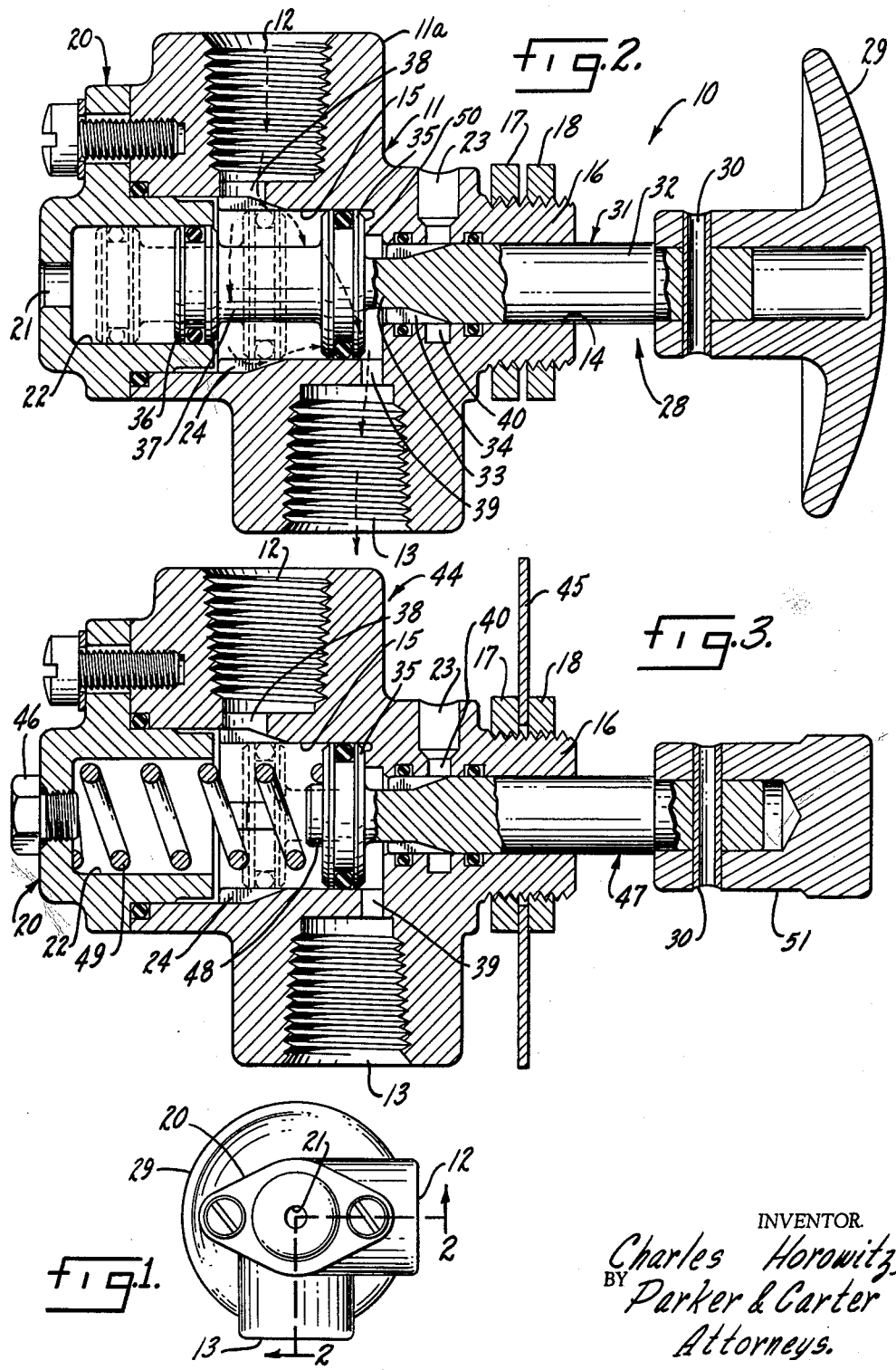
INVENTOR.
Charles Horowitz,
BY Parker & Carter
Attorneys.

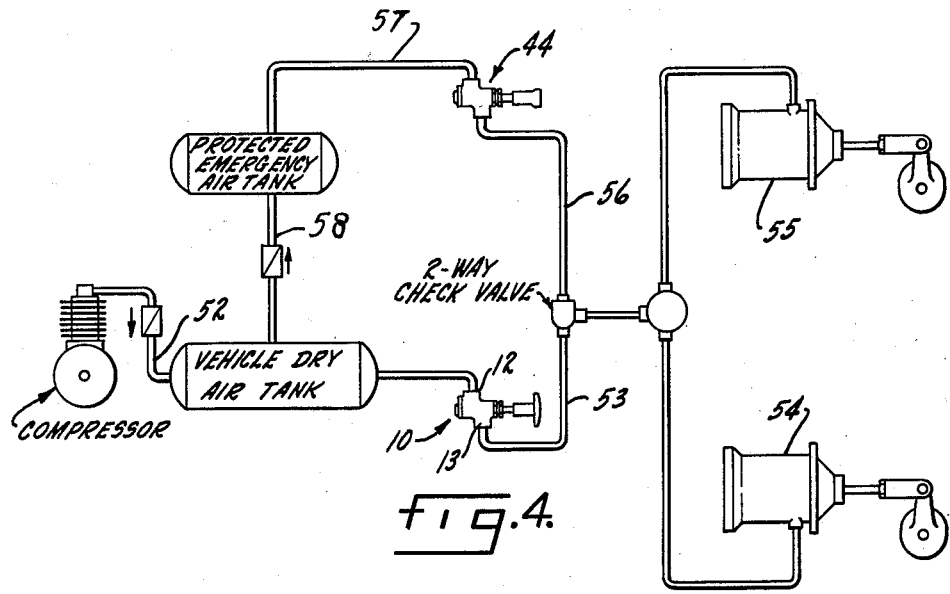

United States Patent Office 3,168,353
Patented Feb. 2, 1965

3,168,353
FLUID PRESSURE CONTROL SYSTEM AND
VALVE THEREFOR
Charles Horowitz, Chicago, Ill., assignor to Berg Airlectro
Products Co., Chicago, Ill., a corporation of Illinois
Filed June 13, 1962, Ser. No. 202,172
2 Claims. (Cl. 303—13)

This invention relates to control valves and particularly to a valve which may be mounted on the dash of a tractor, or at any other convenient location, and which is effective to control the brake applying cylinder employed in tractor-trailer air brake systems.

A primary object of the invention is to provide a control valve which, upon activation due to a drop in service pressure below a given point, may be easily and quickly operated to vent the air brake cylinder in a tractor-trailer air brake system to thereby apply the brakes.

Another object is to provide a valve which may be manually opened to charge the air brake system into which it is connected when the service pressure of the air brake system has reached a predetermined level.

Another purpose is to provide such a valve which will automatically sever communication between the air reservoir of the system with which it is associated and the spring-operated parking and emergency brake element of such system when the pressure from said reservoir is diminished below a predetermined level and the service pressure of such system is at zero pressure.

Yet another object is to provide such a valve in which pressure in the air brake system will maintain the valve in such position that the air brake cylinder will be vented to atmosphere until such time as the operator moves the valve to an operating position.

Another object is to provide an air brake system having a normal brake operating air circuit and an emergency brake operating air circuit, each circuit including a source of air under pressure and a control valve operable, under normal and emergency conditions respectively, for controlling brake cylinder operation.

Yet another object is to provide a basic control valve which, with only slight modification, may be employed as the control valve for either the aforesaid normal or emergency brake operating air circuits.

A further object is to provide a pneumatic control valve for an air brake system having spring brakes, the control valve being operable to either vent the system or to enable a supply of pressure fluid to be admitted to the spring brakes, said control valve requiring only a small manual operating force and remaining stationary in any position in which it is manually set.

A further object is to provide a pneumatic control valve for an emergency air circuit in an air brake system which is biased into a position in which a source of emergency air is protected from the remainder of the system, but which may be manually opened with a minimum of operating force against the biasing force to connect the emergency air source to the system.

Other objects and advantages will appear from time to time in the course of the specification and claims.

The invention is illustrated more or less diagrammatically in the accompanying drawings wherein:

FIGURE 1 is a left end view of the normal spring brake control valve;

FIGURE 2 is a sectional view taken substantially along the line 2—2 of FIGURE 1;

FIGURE 3 is a similar sectional view through the emergency spring brake control valve; and FIGURE 4 is a schematic view, with parts omitted for clarity, of a typical air brake system utilizing the basic valve of the present invention.

Like parts are indicated by like numerals throughout the specification and drawings.

The normal spring brake control valve is indicated generally at 10 in FIGURE 2. The valve includes a housing assembly 11 having a valve body 11a, an inlet 12 and an outlet 13, and a bore extending the length of the housing. The bore includes a reduced diameter portion 14 which opens at its left end into an expanded portion 15. The smaller bore 14 is formed in a projection 16 upon which a pair of adjustment nuts 17, 18 are threaded. The larger bore is closed by an end cap 20 which completes the housing assembly. Cap 20 has a vent port 21 in its left wall. The end cap includes a bore 22 whose axis is in alignment with the axis of the bore in the valve body 11. An outlet vent 23 opens into the small bore 14.

A series of grooves 24 are formed about the circumference of the large bore 15 at its left end. The grooves are formed by cutting a plurality of notches a short distance into the left end of the expanded portion 15, the diameter of the bore being equal to the distance between oppositely disposed lands or teeth between which the grooves or notches are formed.

A spool valve assembly is indicated generally at 28. It includes a handle or depression button 29 which is secured by pin 30 to a spool member 31. The spool member includes a reduced diameter portion 32 which is slidably received within bore 14.

The left end 33 of small bore 14 terminates in a plurality of grooves 34, the external diameter of oppositely disposed teeth or lands between which the notches are formed being equal to the diameter of bore 14. The left end 33 is secured to a piston 35 slidable in the large bore 15. A second piston 36 slidable in bore 22 is integral with and spaced from the first piston 35 by connecting rod 37.

Inlet 12 opens into chamber formed by large bore 15 through a short connecting passage 38 which terminates at the notched portion of bore 15. Outlet 13 opens into communication with the large chamber 15 through a short connecting passage 39. Outlet vent 23 opens into annular groove 40, the annular groove overlying the notched portion of the reduced diameter portion of the spool member 31.

The emergency spring brake control valve is indicated generally at 44 in FIGURE 3. The valve is shown secured to a dash 45 by nuts 17, 18 on projection 16. The vent port in end cap 20 has been closed by removable plug 46. The spool member 47 in this instance terminates with the first large diameter piston 35. A short stub shaft 48 projects outwardly from the left face of piston 35 and serves as a guide pin for a return spring 49 which is biased to urge piston 35 into the solid line position of FIGURE 3. A knob or handle 51 is secured to the right end of spool member 47 by a pin 30.

A brake system incorporating the valves of FIGURES 2 and 3 is shown in FIGURE 4. The normal spring brake control valve 10 is part of an air circuit including a compressor which is connected by line 52 to a main air tank through a one way check valve, the valve being in line 53 between the main tank and a two way check valve. The two way check valve opens into a conventional pneumatic circuit including spring brake cylinders 54, 55.

Emergency spring brake control valve 44 is located in an emergency or reserve air circuit which includes the emergency air tank and lines 57 and 56. Line 58 connects the emergency air tank to the main air tank through the one way check valve, and line 56 connects the emergency spring brake control valve 44 to the two way check valve.

The use and operation of the invention is as follows:
Referring first to FIGURE 4, the system functions during normal operating conditions substantially as follows.

The compressor provides a given supply of air in the main air tank, the pressure of which can be regulated by suitable means which have been omitted for clarity. The two way check valve is in a position connecting line 53 to the air brake cylinders 54 and 55. At the same time the one way check valve between the two tanks enables the emergency air tank to be charged to a suitable pressure while preventing back flow therefrom to the main system, and the two way check valve blocks communication between line 56 and the balance of the system. During normal operation the spool valve assembly 28 of normal spring brake control valve 10 is in the dotted line position of FIGURE 2. Air from the main air tank thereby passes from inlet 12 around piston 35, as illustrated by the dotted arrows in FIGURE 2, and out the outlet 13 to brake cylinder 54 and 55. Since the solid bore section 32 overlies the vent 33, a closed air system is provided. Depression and retraction of the brake pedal by the operator applies and releases the vehicle brakes in the usual manner by structure which has been omitted for clarity.

Should a low vehicle air pressure condition occur in the main air curcuit, the brakes are set when the operator pulls handle 29 from the dotted to the illustrated solid line position. In the solid line position, the system ahead of valve 10 is vented to atmosphere and the springs in the brake cylinder 54, 55 apply the brakes. Communication between the inlet and outlet through the valve is blocked by piston 35.

The spool member of valve 10 remains in whatever position it is placed. It will remain in the dotted line position because the pressure on both sides of piston 35 are equal and extension 16 forms a stop which prevents further leftward movement of the spool member. It will remain in the solid line position because, when so positioned, the pressure on the right side of piston 35 is zero since the right end of bore 15 is open to atmosphere through vent 23, and whatever pressure exists in the balance of bore 15 urges the spool member to the right since the effective pressure area of the left face of piston 35 is larger than the effective pressure area of the right face of piston 36.

Upon application of the spring brakes due to low vehicle air pressure, the two way check valve moves to a position in which the reserve or emergency air circuit is connected to the brake cylinder 54, 55. Movement of the two way check valve will not however release the brakes since spring 49 maintains piston 35 in the solid line position of FIGURE 3, and in this position line 56 is open to atmosphere through vent 23.

After the two way check valve has moved to emergency position, and the brakes have been set, the operator may release the brakes by manually depressing handle 51 to the left against the action of spring 49. As spool member 47 moves to the left it blocks vent 23 and connects the emergency air tank to line 56 and thereby the brake cylinder 54, 55 so that the operator may thereafter drive his vehicle off the roadway or to a repair area where the cause of the low vehicle air pressure can be determined and corrected.

The air from the emergency air tank flows around piston 35 in its dotted line position and through grooves 24 to the outlet 13.

As can be readily observed from FIGURES 2 and 3 the valves of these figures are identical except for the addition of plug 46 to the emergency valve and the substitution of a spring and slightly altered spool member for the spool member of the normal valve. Both valves may be mounted on the dash for easy accessibility by the operator and both utilizes the notches 24, 34 for the selective passage of air upon change of position of the spool member.

Although two embodiments of the invention have been illustrated and described, it should be understood that the scope of the invention be measured not solely by the description but rather by the following claims as interpreted in light of the prior art, having due regard to the doctrine of equivalents.

I claim:
1. A vehicle brake system including a main pressure reservoir, an emergency pressure reservoir, a pressure conduit between said reservoirs, a check valve in said conduit to permit passage of pressure from said main to said emergency reservoir and to preclude passage of pressure in the opposite direction, a second pressure conduit extending from said main reservoir and discharging into one side of a two-way check valve, a third pressure conduit extending from said emergency reservoir and discharging into the opposite side of said two-way check valve, a fourth pressure conduit extending from said two-way check valve and discharging into a plurality of spring-applied, pressure-release brake-actuating members, a first control valve in said second pressure conduit, a second control valve in said third pressure conduit, each of said control valves having a vent passage to atmosphere, each of said control valves having a manually operable handle element extending therefrom, each of said handle elements being movable in one direction to permit passage of fluid pressure through its associated conduit and movable in the opposite direction to preclude said passage of fluid pressure and to vent the downstream portion of its associated conduit to atmosphere, said first control valve having elements effective to maintain the position in which they are placed in response to fluid pressure entering said first control valve, said second control valve being yieldingly urged into venting position.

2. For use with a vehicle brake structure having a plurality of spring-applied, pressure-released brake-actuating members and conduits leading from a two-way check valve to said members, a pressure supply system including a main pressure reservoir, an emergency pressure reservoir supplied from said main pressure reservoir, a first pressure conduit extending from said main reservoir and discharging into said two-way check valve, a second pressure conduit extending from said emergency reservoir and discharging into said two-way check valve, a first control valve intermediate the ends of said first pressure conduit, a second control valve intermediate the ends of said second pressure conduit, each of said control valves having a vent passage to atmosphere and a manually operable handle element extending therefrom, each of said handle elements being movable in one direction to permit passage of fluid pressure through its associated conduit and movable in the opposite direction to preclude said passage of fluid pressure and to vent the downstream portion of its associated conduit to atmosphere, said first control valve having elements effective to maintain the position in which they are placed in response to fluid pressure entering said first control valve, said second control valve being yieldingly urged into venting position.

References Cited in the file of this patent
UNITED STATES PATENTS

| | | |
|---|---|---|
| 1,957,567 | Williams | May 8, 1934 |
| 2,354,791 | Boldt | Aug. 1, 1944 |
| 2,499,154 | Nielsen | Feb. 28, 1950 |
| 2,564,686 | Gray | Aug. 21, 1951 |
| 2,645,307 | Stegman | July 14, 1953 |
| 3,085,833 | Schultz | Apr. 16, 1963 |
| 3,107,126 | Valentini | Oct. 15, 1963 |

FOREIGN PATENTS

| | | |
|---|---|---|
| 659,539 | Great Britain | Oct. 24, 1951 |